US006712339B1

(12) United States Patent
Smith

(10) Patent No.: US 6,712,339 B1
(45) Date of Patent: Mar. 30, 2004

(54) MODULAR FENCE

(75) Inventor: Frederick Smith, Marion, NY (US)

(73) Assignee: Frederick, L.L.C., Palmyra, NY (US)

( * ) Notice: Subject to any disclaimer, the term of this patent is extended or adjusted under 35 U.S.C. 154(b) by 0 days.

(21) Appl. No.: 09/571,595

(22) Filed: May 15, 2000

(51) Int. Cl.[7] .............................................. H05C 1/00
(52) U.S. Cl. .......................................... 256/10; 256/24
(58) Field of Search ............................ 160/135; 256/10, 256/24, 26, 25, 59; 174/158; 248/175

(56) References Cited

U.S. PATENT DOCUMENTS

| | | | | |
|---|---|---|---|---|
| 1,511,597 A | * | 10/1924 | Fergusson | |
| 2,512,740 A | * | 6/1950 | Evans | |
| 2,517,386 A | * | 8/1950 | Cooper | |
| 3,756,566 A | * | 9/1973 | Bangs | |
| 4,174,096 A | | 11/1979 | Campbell | 256/24 |
| 4,371,148 A | * | 2/1983 | Harden | |
| 4,494,733 A | * | 1/1985 | Olsson | |
| 4,676,485 A | * | 6/1987 | Ciordinik et al. | |
| 4,860,996 A | * | 8/1989 | Robbins, III | |
| 4,997,127 A | | 3/1991 | McEwen | 231/7 |
| 5,163,658 A | * | 11/1992 | Cleveland | |
| 5,595,230 A | * | 1/1997 | Guerra | |
| 6,264,172 B1 | * | 7/2001 | Ball et al. | 256/10 |
| 6,450,483 B1 | * | 9/2002 | Baum | 256/10 |

FOREIGN PATENT DOCUMENTS

| | | | |
|---|---|---|---|
| GB | 1 450 187 | | 9/1976 |
| GB | 1 604 155 | | 12/1981 |
| GB | 21855841 A | * | 7/1987 |
| NL | 9401555 | | 9/1994 |
| WO | WO 96/13817 | | 5/1996 |

* cited by examiner

Primary Examiner—Lynne H. Browne
Assistant Examiner—Ryan M. Flandro
(74) Attorney, Agent, or Firm—Fitzpatrick, Cella, Harper & Scinto

(57) ABSTRACT

A modular electric fence panel including a support structure spanning a vertical distance and comprising at least two substantially vertical support members spaced apart from one another by a substantially horizontal support member. Each vertical support member is connectable to a corresponding vertical support member of an adjacent fence panel. The fence panel also includes a plurality of wire-grid conductors spaced apart along the support structure covering a majority of the vertical distance, a wire conductor positioned substantially at the top of the vertical distance, a first negatively charged conductor affixed to the support structure adjacent the ground, and a self-supporting stand for holding the panel upright on the ground. A pair of conductors may be oppositely charged and the wire conductor includes a charge opposite to a charge on one of the charged conductors adjacently positioned below.

24 Claims, 7 Drawing Sheets

MODULAR FENCE

BACKGROUND OF THE INVENTION

1. Field of the Invention

The present invention relates to a novel fencing system to keep animals from entering an enclosed area, or alternatively, to contain animals within the enclosed area.

2. Related Background

Electrical sub-stations provide local power to communities around the world. They include electrical transformers and other equipment used to convert high-voltage, low current electricity to low voltage, high current for local consumption. object, may be electrically grounded thereby shorting out the equipment and tripping a circuit breaker. The end result is a disruption of power and/or equipment damage.

Electrical shorting of sub-station equipment occurs mostly when rodents such as squirrels, rats, mice, raccoons and snakes, traverse the equipment and electrically connect a positively charged portion to ground, the animal body acting as a circuit bridge. Although most, if not all, sub-stations include common fence structures (e.g., chain-link fencing) to keep both trespassers and animals away from equipment, the fences do not entirely stop animals from entering the grounds of a sub-station. Many animals are able to climb the fence and negotiate any other impediment to their path, i.e., barbed wire, to enter the grounds.

Thus, there is a need for an inexpensive, easily installed system which will deter animals from entering the grounds of an enclosed area.

SUMMARY OF THE INVENTION

The present invention addresses the above problem and presents a new and novel fencing system for deterring animals from entering/leaving an enclosed area.

In one aspect of the present invention, an electric fence includes a support structure spanning a vertical distance with a plurality of conductors spaced apart along the support structure to cover a majority of the vertical distance. A pair of the conductors may be charged to create a difference of electric potential between them.

In yet another aspect of the present invention, a modular electric fence system includes a plurality of interconnected fence panels as described in the previous aspect, and also includes a charger for applying a difference in electrical potential to at least one of the conductors, a gate having a first side hinged to a side of a first fence panel and a second side removably fastened to a side of a last fence panel, and a self-supporting stand mountable to at least one of the fence panels for holding the fencing system upright.

The support structure may include at least two substantially vertical support members spaced apart from one another by a substantially horizontal support member, with each vertical support member connectable to a corresponding vertical support member of an adjacent fence panel.

Either of the above aspects may also include a wire conductor positioned at the top of the support structure, where the wire is charged to a difference of electric potential relative to one of the conductors adjacently positioned below the wire conductor.

It is a feature of the above aspects of the present invention that as an animal climbs the fence, it receives an electrical shock when it bridges oppositely charged conductors which deter the animal from climbing further. In most circumstances, the animal immediately jumps off the fence and scurries away.

In yet another aspect of the present invention, a modular fence system includes a plurality of fence panels each having a support structure as described in the previous aspects. The system also includes a plurality of self-supporting stands, with each stand being shared between said vertical end supports of two fence panels. Each stand includes a flat base and a first rod projecting substantially vertical from the flat base and having a length substantially equal to a majority of the vertical distance of the support structure. The first rod receives a vertical end support of a first fence panel. The stand also includes a second rod spaced apart from the first rod and projecting substantially vertical from the base. The second rod includes a length substantially shorter than the length of the first rod and receives a vertical end support of a second panel adjacent to the first panel. The space between the first rod and the second rod allows the first fence panel to pivot on the first rod in the z direction and allows the first fence panel to swing around the first rod in the x and y planes. The space between the first rod and the second rod allows the vertical end support of the second fence panel to be easily removed therefrom.

DETAILED DESCRIPTION OF THE PREFERRED EMBODIMENT

Figure 1:
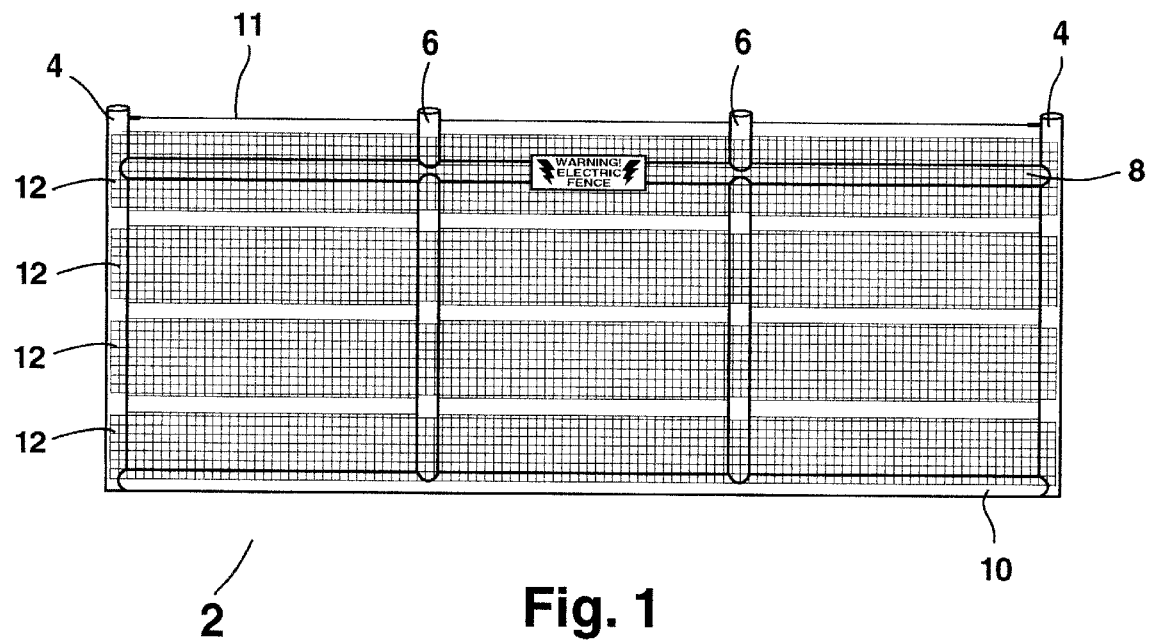
FIG. 1 is a schematic elevational view of a fence panel according to the present invention.
Figure 2:
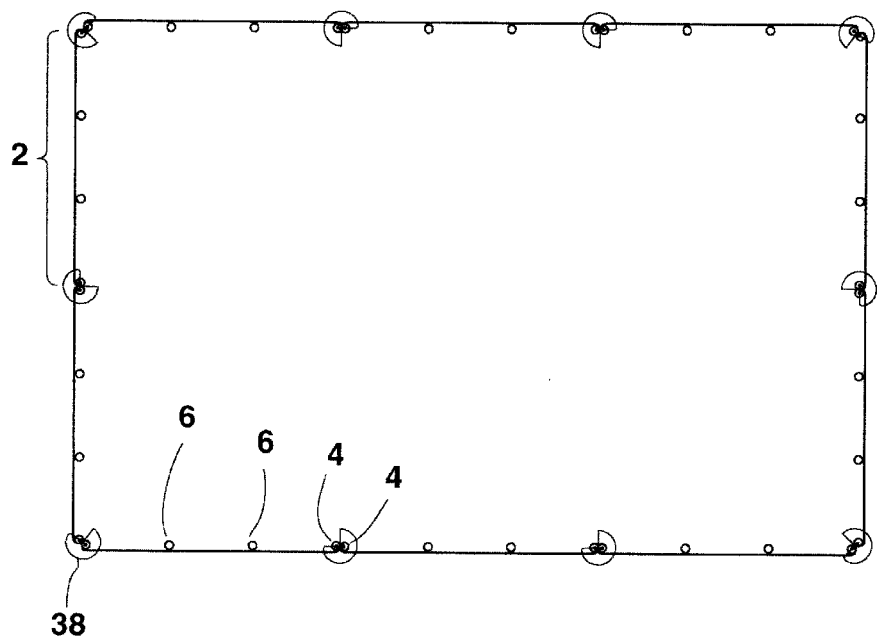
FIG. 2 is a schematic top plan view of an electric fence system according to the present invention.

FIGS. 1–8 illustrate the fence system according to the present invention. The fence system 1 includes a plurality of individual fence panels 2 that can be arranged in any convenient configuration. The panels may be re-arranged easily, so that the enclosed area may be enlarged or made smaller.

Each fence panel includes a support structure made up of a plurality of hollow plastic tubes or pipes. Such pipes are generally made of PVC and are available in a number of different lengths and diameters. Although the present invention is shown and described using tubes, other support members having other cross-sectional shapes may be used (e.g., square, rectangular, triangular, etc.).

The tubes are fitted and affixed with each other to form the support structure with the required structural characteristics.

The support structure may include two vertical end supports 4 positioned on either end of the panel, a top horizontal support 8, a bottom horizontal support 10, and two vertical inner supports 6 positioned equidistantly along the top and bottom horizontal supports to divide the fence panel into three equal sections.

The ends of each of the top and bottom horizontal supports are received in corresponding recesses positioned adjacent the top and bottom portions of each vertical end support. The vertical inner supports are received in the top horizontal support in a pass-through recess which allows the top of the vertical inner support member to project out past the top horizontal support member. The bottom of the vertical inner support is received in a recess opening corresponding in position to the pass-through recesses of the top horizontal member.

All of the support members are affixed one another via either adhesive, frictional fit, fasteners or a combination thereof. One skilled in the art would appreciate that many different support structure/panel configurations are possible using support members according to the present design. Specifically, panels of any specific length and height may be made. Moreover, depending upon the structural rigidity of the support members, some of the support members may not be necessary (e.g., vertical/horizontal inner support members).

Attached to the support structure are a plurality of electrical conductors 12. The conductors are wire grids having a predetermined width and a length equal to the length of the fence panel. They are affixed to the fence panels using self-tapping steel screw fasteners 24, which automatically create a hole as they are turned into the support member. Other fasteners may also be used to attach the conductors to the support structure, they include rivets, clips, and hangers. Conductors may also be adhered to the support members using epoxy adhesives and the like, or even welded in place. Moreover, the conductors may also be fitted into recesses in the vertical support members.

It will be appreciated by one of ordinary skill in the art that wire-grid conductors of high tensile strength could be used to horizontally stabilize the support structure, thereby eliminating the use of any horizontal support members.

The conductors are spaced apart along the support structure and cover a majority of the vertical distance. It is preferred that the conductors are spaced along most of the vertical distance of the support structure from bottom to top. The distance between adjacent conductors may generally be about 0.25–6" and preferably between 0.5–2".

Adjacent conductors may be oppositely charged so that an animal climbing the fence will receive an electrical shock once it touches the next higher, adjacent conductor. Thus, the first conductor positioned along the bottom of the support structure may be positively or negatively charged, with the next conductor positioned above the bottom conductor having an opposite charge. It is preferred that the first conductor positioned adjacent the ground have a negative charge since there is a greater possibility of a positively charged first conductor shorting to ground due to moisture.

In an effort to stop animals from crawling through the spaces between the conductors, the tops and bottoms of the conductors are bent towards or away from the enclosed area. An animal who attempts to climb between the conductors encounters more than the wire-width of the conductor to negotiate a shockless path to get to the enclosed area.

In the preferred embodiment of the present invention, a wire conductor 11 having a charge opposite to the conductor positioned immediately below, is strung across the top of fence panel. The wire conductor is provided in this location so that in case an animal jumps from the ground or an adjacent object to the top conductor, it will encounter the wire when it tries to get into the fenced enclosure, and thus, receive a shock.

Although two conductors carrying an electrical potential between them is sufficient to enable the present invention to work, it is preferred that at least two wire-grid conductors be used in conjunction with the top-wire conductor. It is most preferred that an even number plurality of wire-grid conductors be used with the top wire conductor, where the first wire-grid conductor positioned adjacent the ground be negatively charged, adjacent wire-grid conductors being oppositely charged, and the top wire conductor having a negative charge.

Using a standard size conductor for modularity, the number of conductors is directly dependent upon the height of the fence. Thus, the higher the fence, a greater number of conductors is required. Generally, a four foot high fence will suffice for most applications, and by using wire-grid conductors having a width of about approximately 9", a total of four would be preferred used in conjunction with the top wire conductor.

Figure 3:
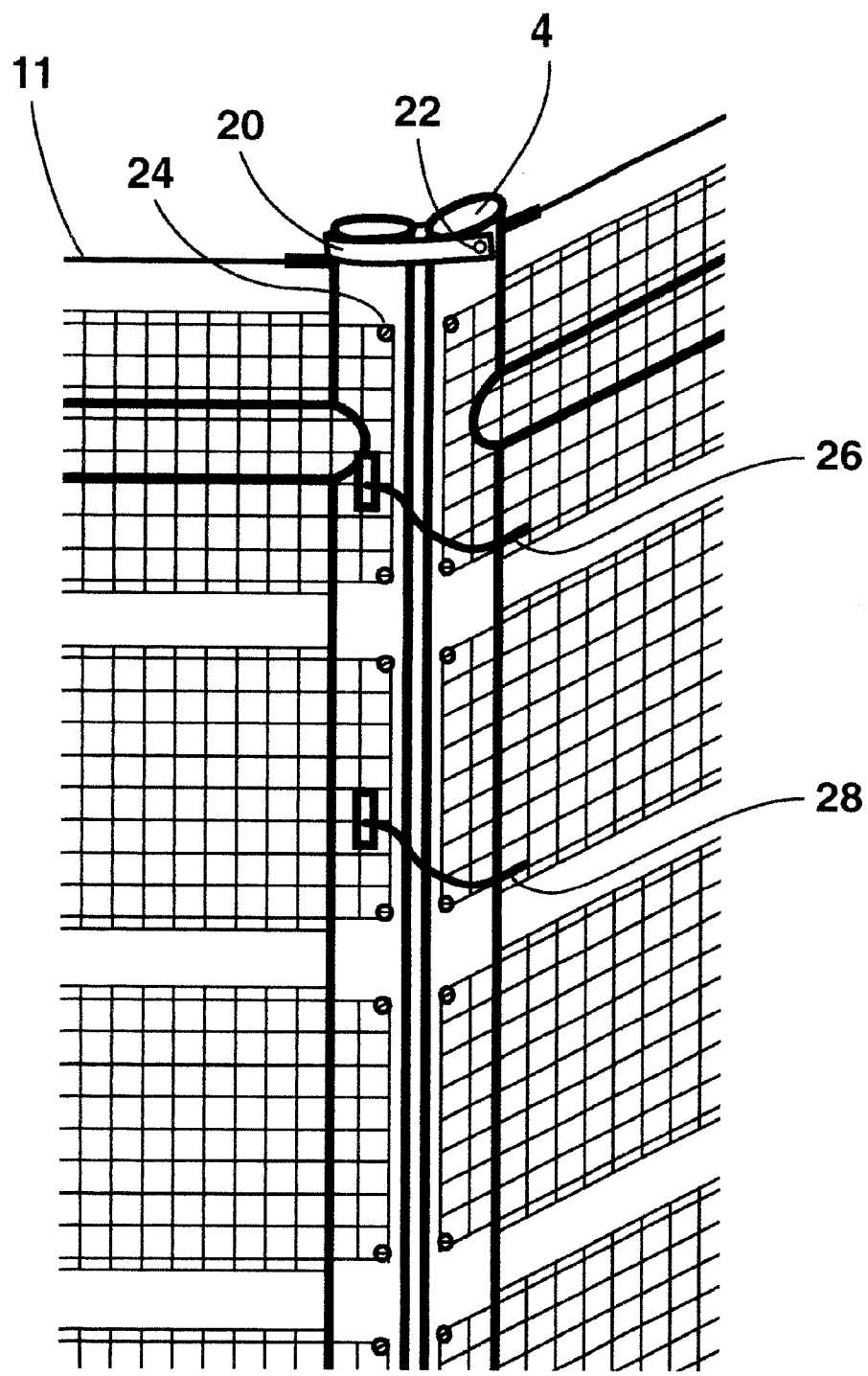
FIG. 3 is a partial elevational perspective view illustrating a corner connection between adjacent fence panels according to the present invention.
Figure 4:
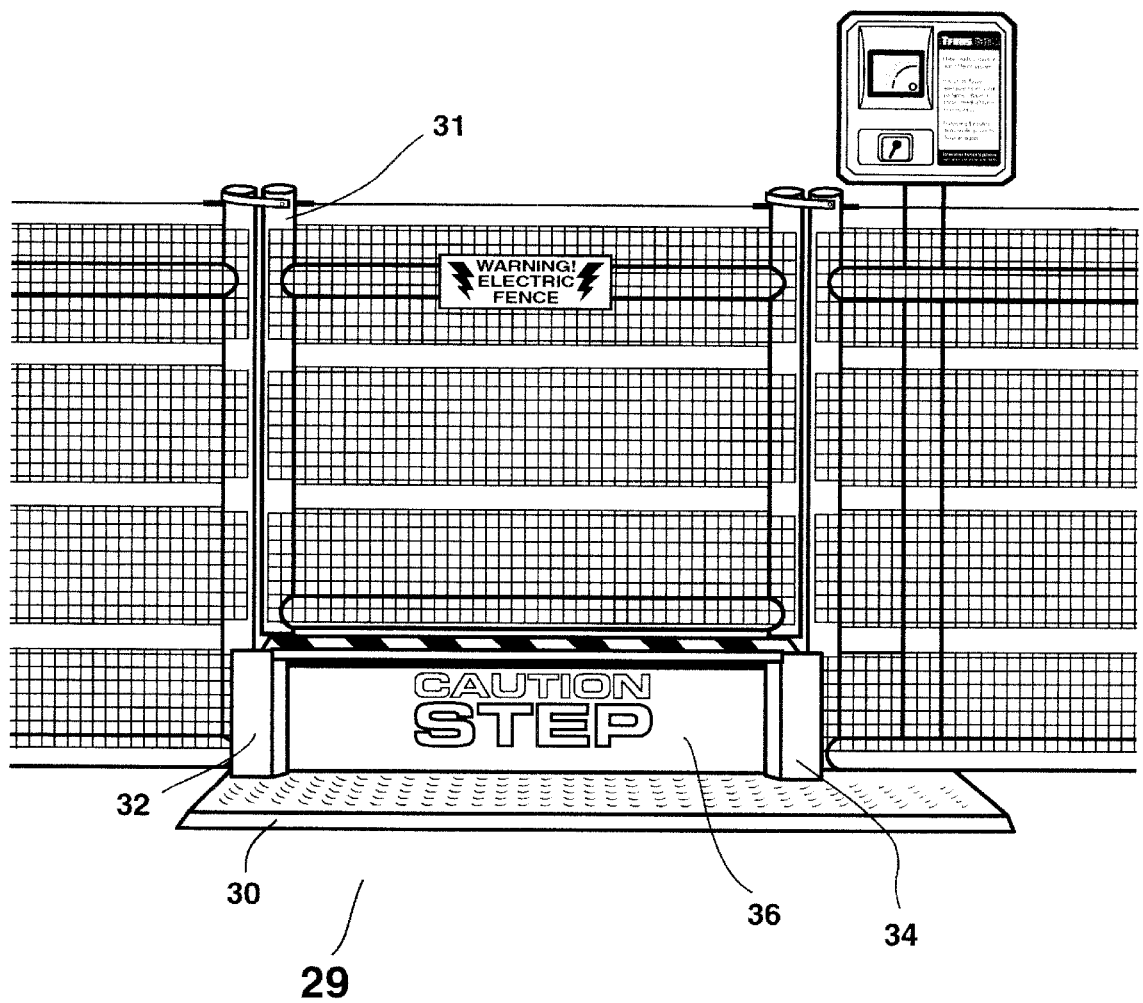
FIG. 4 is a schematic front view of an access platform and gate for the electric fence system according to the present invention.
Figure 5:
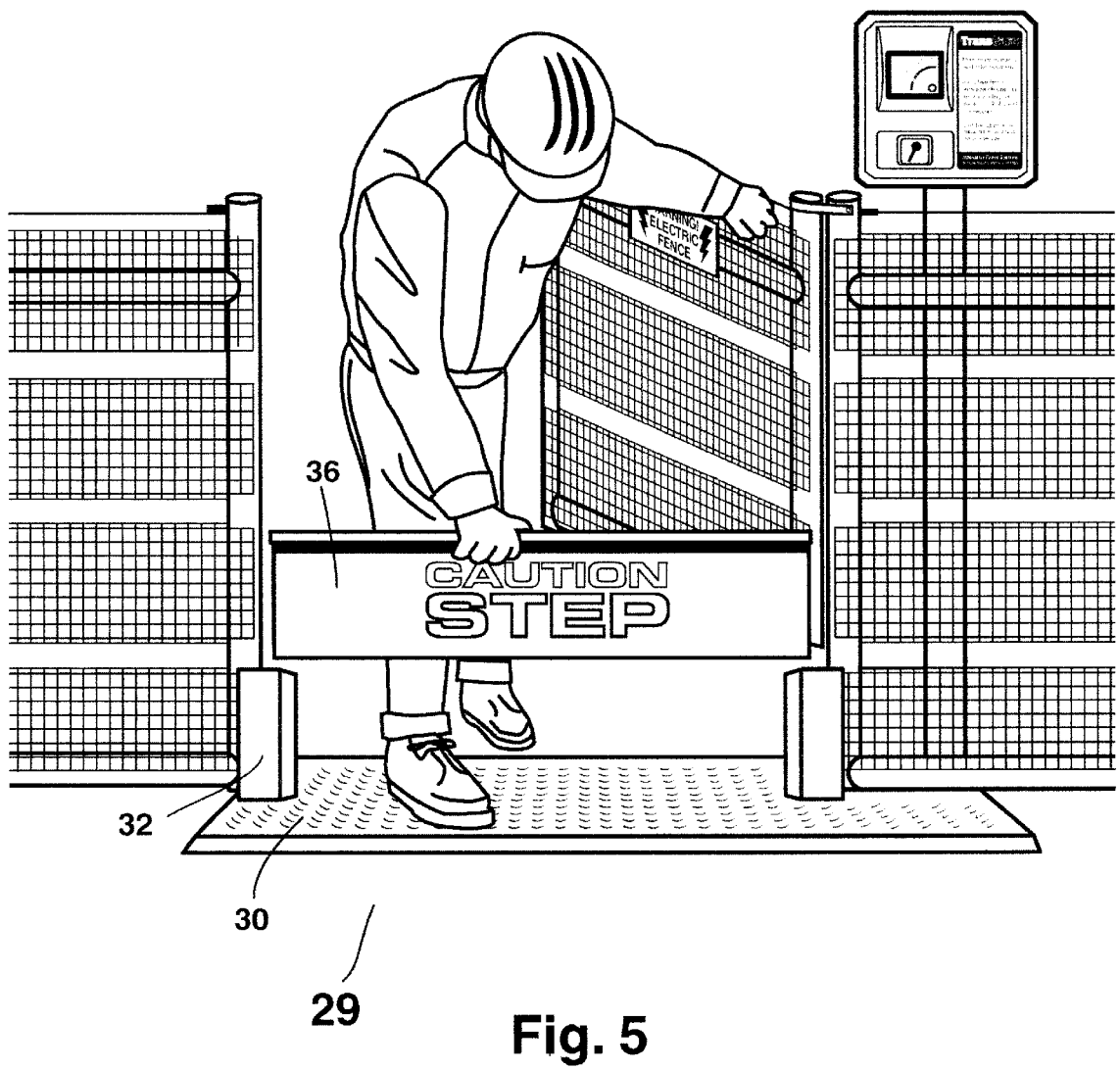
FIG. 5 is a schematic front view of the access platform illustrating the removal of a step member according to the present invention.

Although all conductors on each panel may be electrically linked to corresponding conductors positioned on adjacent panels, only one positive charged conductor and one negative charged conductor are required to be electrically connected to corresponding conductors on adjacent fence panels. Each respective set of positively charged conductors and negatively charged conductors on a fence panel are then interconnected to charge the remaining conductors. As shown in FIG. 3, connector 26 electrically connects a set of similarly charged adjacent conductors on two fence panels, and connector 28 electrically connects a second set of similarly charged adjacent conductors having a charge opposite to that of the set of conductors connected by connector 26.

The conductors may be charged via any commercially available, agricultural-type pulsating DC voltage charging device 48 (low current), which may be located anywhere near the fencing system. All that is required is that it be electrically connected to at least one of the conductors requiring positive charging. With the advent of solar powered charging devices and rechargeable batteries, location near an AC power outlet is not required, although an AC power outlet may be used for charging devices requiring AC voltage.

Typical agricultural charging devices generally include a voltage meter 50 which reads voltage at the end of the fence system—a specific voltage, and a power switch 52. An audible sound is made when a positive and negative conductor are bridged. However, if such an audible sound is present and the voltage meter reads zero, the fence may be shorting out, or may contain a break in the electrical connection between the charging unit and the fence, or between fence panels.

In the preferred embodiment of the present invention, the charging unit is located on an insulated stand near a gated entry, since an entry is generally located at a convenient access point.

To make the panels stand upright, a novel stand base 38 is used. The stand bases include a large, flat footprint 40 made up of either a solid flat panel, or preformed rod that is bent into a specific shape (e.g., circular, triangular, rectangular). Projecting up from the center 42 of the base is a panel receiving area. The panel receiving area may be a recess for receiving the fence panel, or it may be a rod that is received in a vertical support member.

Figure 6:
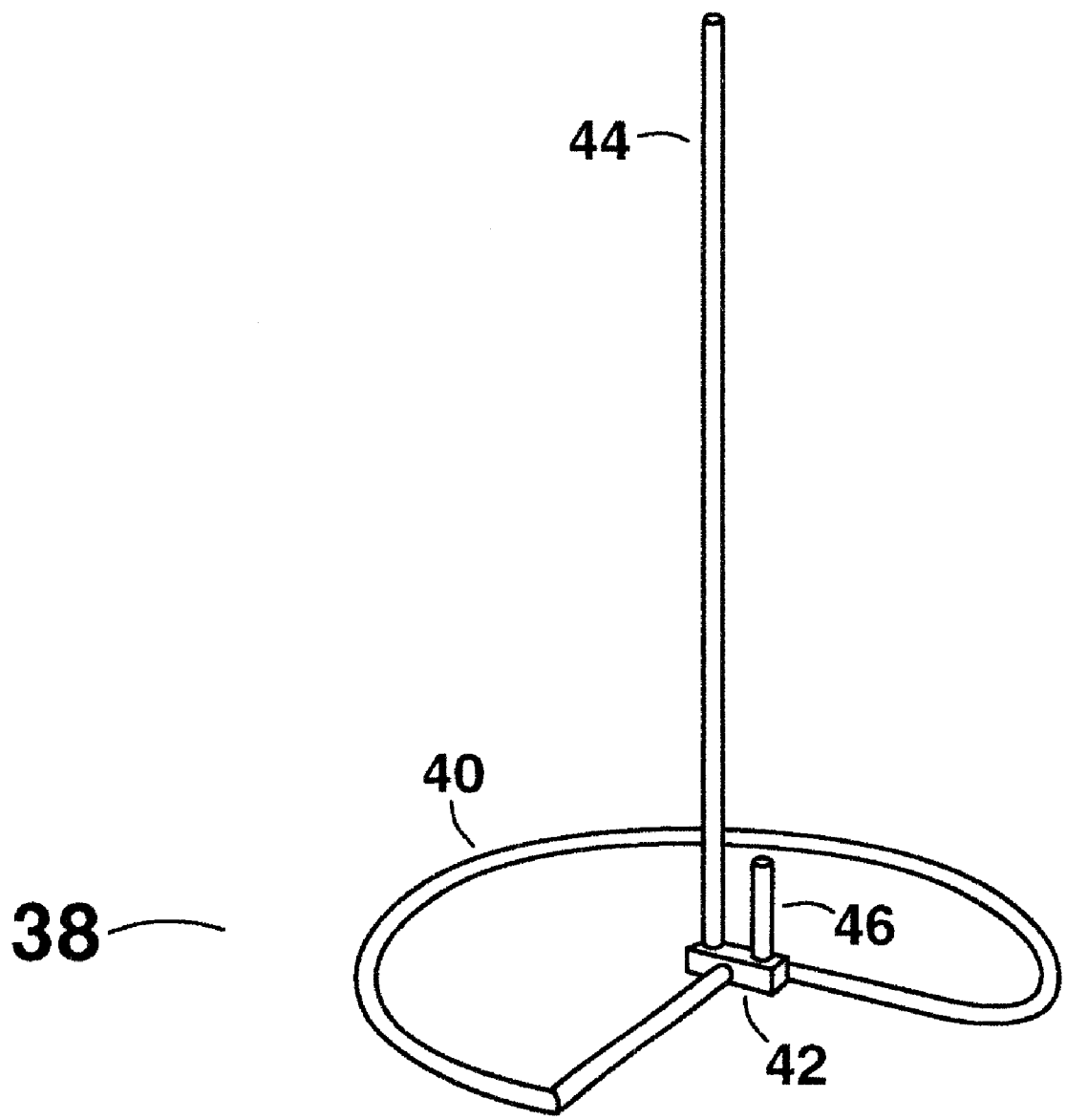
FIG. 6 is a perspective view of a self-supporting stand for use with the electric fence system according to the present invention.
Figure 7:
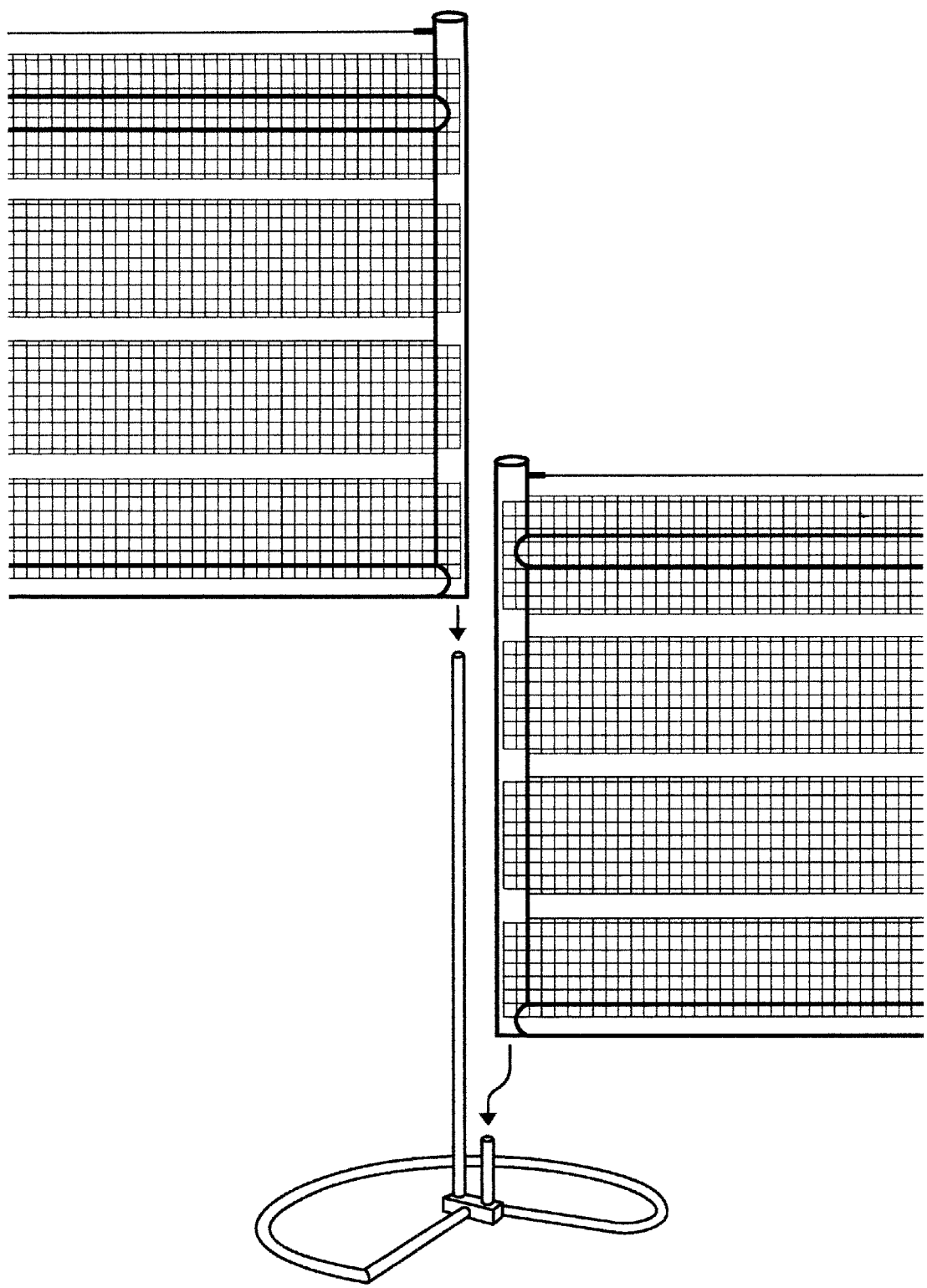
FIG. 7 is a front sectional view of the self-supporting stand illustrated with two adjacent fence panels according to the present invention.
Figure 8:
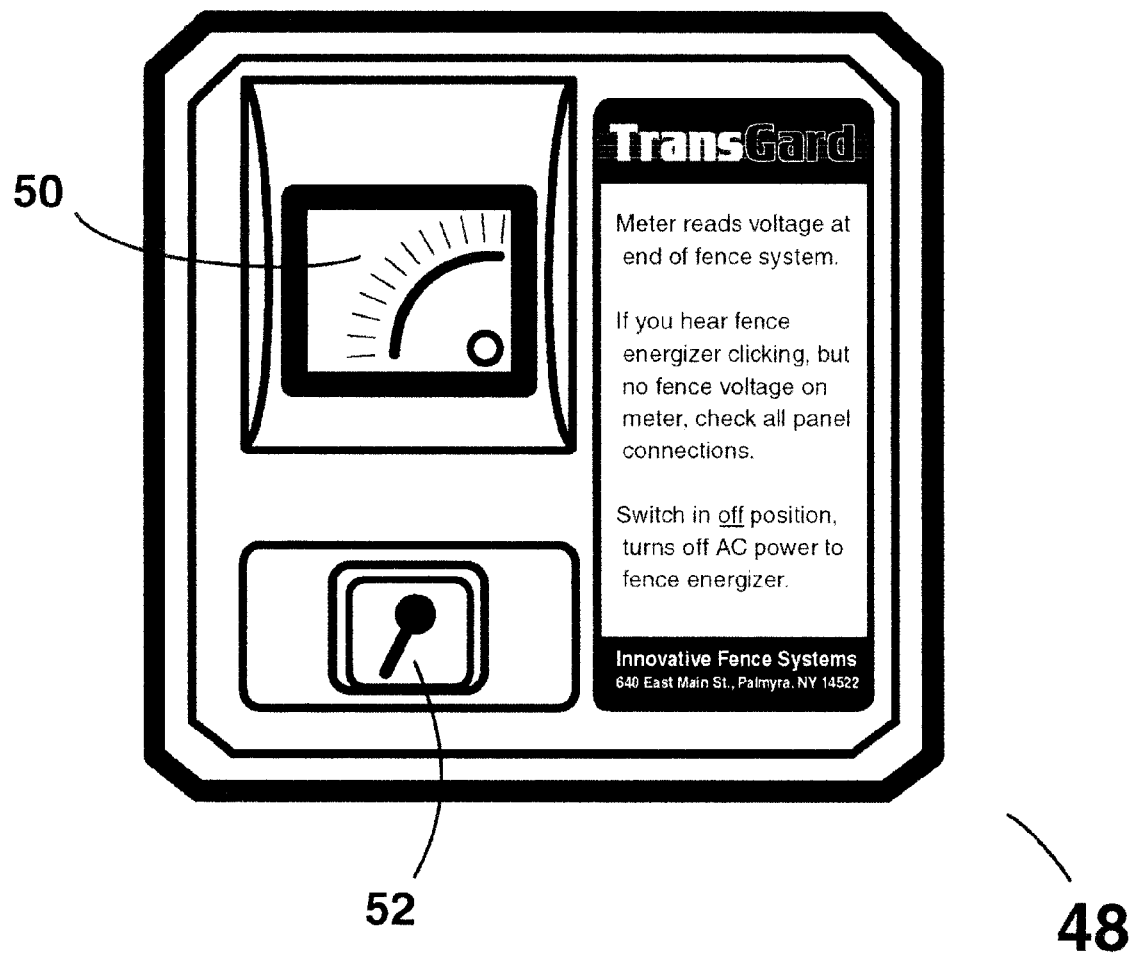
FIG. 8 is a front view of a charging device for applying a difference in electrical potential between two conductors on the fence system according to the present invention.

As shown in FIG. 6, a metal rod is bent in a circular shape, with the ends of the rod terminating in the center. Projecting up from the center is a first rod 44, which is received within the end of the vertical end support of a first fence panel. The first rod spans a vertical distance substantially equal to the length of the vertical support members. A second shorter rod 46 also projects up from the base, but by only a few inches. The shorter rod is used to connect an adjacent second panel to the stand base. One end of the first panel receives the first long rod, and one end of the second panel receives the second short rod.

The stand bases enable the fence system according to the present invention to be easily installed and keep the fence system from collapsing by keeping each section of the fence substantially vertical and interconnecting the bottoms of adjacent fence panels. U-shaped brackets 20 having ends attached by fasteners 22 to the top of a vertical end support of a panel are used to secure the upper portions of adjacent end supports. When adjacent fence panels are brought together after placing them on respective first and second rods of a stand base, a U bracket is affixed to one end support and then folded over the end support of the adjacent panel.

It is a feature of this design that any fence panel may be used as a gate. The end of the panel receiving the first rod of the stand base acts as the gate hinge allowing the remaining end to swing inward or outward. All that is required of the swinging end is that the bottom be lifted slightly to overcome the second rod of the stand base. This is easily accomplished since the first and second rods are spaced apart from one another at a distance that allows the swinging end of the fence panel to pivot up and down slightly—enough so that the bottom of the end may be lifted off the shorter second rod.

Although the stand bases are not required to be dug into the ground, it is preferred that a ballast or gravel be used to cover the base of the stand as an added measure to keep the fence system securely upright. Since most substations include a gravel ground cover, covering the stand bases is easily accomplished. An installer simply rakes back the stone, places the stand base down, then covers over the base of the stand base with the raked back stone.

In one embodiment of the present invention, a unique gateway 29 for easy entry into and out of the fenced enclosure is provided. The gateway includes a flat platform 30 which includes panel terminating areas 32 and 34 provided on two opposite sides. The platform terminating areas may be designed similar to the stand bases by using vertical rods received in the ends of respective fence panels, or any other convenient method of securing each end of a first and last fence panel to either side of the gateway (e.g., latches, fasteners, recesses, etc.).

Between the two terminating areas on the platform is an opening including a gate 31. The gate is similarly designed to the individual fencing panels, except that it is smaller. It is generally sized to that of a typical doorway, or between 3–5 feet, and preferably between 3–4 feet. Since the gate is small in length, only two vertical support members are necessary.

The gateway may also include a solid step 36 positioned under the gate. This feature enables an enclosed area to be easily accessed in the event of deep snow, without having to shovel snow away from the gateway.

To allow large equipment to pass through the gateway without having to lift it over the step, the step may be removable.

Although the present invention is illustrated using a gateway to access the enclosed area, it is not necessary. Any fence panel may be used as a gate.

Other variations and modifications of this invention will be apparent to those skilled in this art after careful study of this application. This invention is not to be limited except as set forth in the following claims.

What is claimed is:

1. An electric fence comprising:
   a support structure spanning a vertical distance, and
   a plurality of horizontally-disposed, exposed conducting grids that are vertically spaced apart along said support structure so that a vertical gap exists between at least two adjacent conducting grids of said plurality of conducting grids,
   wherein the adjacent conducting grids are charged to create a difference of electric potential between them, and a size of the vertical gap and the difference of electric potential are such that an electric shock is delivered when the adjacent conducting grids are contacted.

2. The electric fence according to claim 1, wherein said fence is a modular panel and said support structure includes sides each of which is connectable to a side of an adjacent corresponding fence panel.

3. The fence panel according to claim 2, wherein corresponding similarly charged ones of said plurality of conducting grids of adjacent fence panels are electrically connected.

4. The fence according to claim 2, further comprising a self-supporting stand for holding said modular panel upright on the ground.

5. The fence according to claim 1, wherein said support structure comprises at least two substantially vertical support members spaced apart from one another.

6. The fence panel according to claim 5, wherein said vertical support members are spaced apart from one another by a substantially horizontal support member.

7. The fence according to claim 1, further comprising a charger for applying an electrical charge to at least one conducting grid of said plurality of conducting grids.

8. The electric fence according to claim 1, wherein the size of the vertical gap is configured to prevent small mammals and reptiles from passing between the adjacent conducting grids.

9. An electric fence comprising:
   a support structure spanning a vertical distance,
   a plurality of horizontally-disposed, exposed conducting grids that are vertically spaced apart along said support structure so that a vertical gap exists between at least two adjacent conducting grids of said plurality of conducting grids, and
   a wire conductor positioned substantially at the top of the vertical distance,
   wherein the adjacent conducting grids may be charged to create a difference of electric potential between them, and a size of the vertical gap and the difference of electric potential are configured to deliver an electric shock when the adjacent conducting grids are contacted, and
   wherein said wire conductor is charged to a difference of electric potential relative to one conducting grid of said plurality of conducting grids adjacently positioned below.

10. An electric fence comprising:
    a support structure spanning a vertical distance, a plurality of horizontally-disposed, exposed conducting grids that are vertically spaced apart along said support structure so that a vertical gap exists between at least two adjacent conducting grids of said plurality of conducting grids, wherein the adjacent conducting grids may be charged to create a difference of electric potential between them, and a size of the vertical gap and the difference of electric potential are configured to deliver an electric shock when the adjacent conducting grids are contacted, and wherein a negatively charged conducting grid of said plurality of conducting grids is affixed to said support structure adjacent the ground.

11. A modular electric fence system for enclosing an area, said system comprising:

a plurality of interconnected fence panels, each said fence panel comprising
a support structure spanning a vertical distance, a plurality of horizontally-disposed, exposed conducting grids that are vertically spaced apart along said support structure so that a vertical gap exists between at least two adjacent conducting grids of said plurality of conducting grids,
wherein the adjacent conducting grids may be charged to create a difference of electrical potential between them, and a size of the vertical gap and the difference of electric potential are configured to deliver an electric shock when the adjacent conducting grids are contacted;

a charger for applying the difference of electric potential to the adjacent conducting grids; and a self-supporting stand for receiving the ends of adjacent panels for holding said fence panels upright.

12. The fence system according to claim 11, wherein said support structure includes sides each of which is connectable to a side of an adjacent corresponding fence panel.

13. The fence system according to claim 11, wherein one of said fence panels is structured to serve as a gate.

14. The fence system according to claim 11, further comprising a gate and an access platform positioned below said gate, said access platform including fence panel terminating areas provided on two opposite sides, wherein a side of a first fence panel of said plurality of interconnected fence panels is affixed to one of said terminating areas and a side of a last fence panel of said plurality of interconnected fence panels is affixed to the other said terminating area.

15. The fence system according to claim 14, wherein said access platform includes a movable, vertical barrier positioned below said gate.

16. The fence system according to claim 11, wherein corresponding similarly charged ones of said plurality of conducting grids of adjacent fence panels are electrically connected.

17. The fence system according to claim 11, further comprising a charged wire conductor positioned substantially at the top of the vertical distance, wherein said wire conductor is charged to a difference of electric potential relative to one conducting grid of said plurality of conducting grids adjacently positioned below.

18. The fence system according to claim 11, wherein said support structure comprises at least two substantially vertical support members spaced apart from one another by a substantially horizontal support member having ends each of which are affixed to one of said vertical support members.

19. The fence according to claim 11, wherein a conducting grid of said plurality of conducting grids that is adjacent the ground is negatively charged.

20. The modular electric fence system according to claim 11, wherein the size of the vertical gap is configured to prevent small mammals and reptiles from passing between the adjacent conducting grids.

21. A modular electric fence panel comprising:

a support structure spanning a vertical distance and comprising at least two substantially vertical supports spaced apart from one another by a substantially horizontal support, each vertical support connectable to a corresponding vertical support of an adjacent fence panel;

a plurality of horizontally disposed, exposed wire-grid conductors that are vertically spaced apart along said support structure so that a vertical gap exists between at least two adjacent wire-grid conductors of said plurality of wire-grid conductors, wherein the adjacent wire-grids conductors may be oppositely charged to create a difference of electric potential between them, and a size of the vertical gap and the difference of electric potential are configured to deliver an electric shock when the adjacent wire-grid conductors are contacted, and a first negatively charged wire-grid conductor may be positioned adjacent the ground;

a wire conductor for being negatively charged positioned substantially at the top of said vertical distance, wherein an adjacent wire-grid conductor positioned below said wire conductor may be positively charged; and a self-supporting stand for receiving a vertical support end of said panel for holding said panel upright.

22. The modular electric fence panel according to claim 21, wherein the size of the vertical gap is configured to prevent small mammals and reptiles from passing between the adjacent conducting grids.

23. A modular fence system comprising:

a plurality of fence panels each comprising a support structure spanning a vertical distance and comprising at least two substantially vertical support members spaced apart from one another by a substantially horizontal support member, each vertical support member connectable to a corresponding vertical support member of an adjacent fence panel;

a plurality of self-supporting stands, wherein each stand is shared between two of said vertical support members of two fence panels, each said stand comprising:
a flat base;
a first rod projecting substantially vertical from said flat base and having a length substantially equal to a majority of said vertical distance of said support structure, said first rod for receiving one of said vertical support members of a first fence panel; and
a second rod spaced apart from said first rod and projecting substantially vertical from said base, said second rod having a length substantially shorter than the length of said first rod, said second rod for receiving one of said vertical support members of a second panel adjacent to said first panel, wherein the space between said first rod and said second rod allows said first fence panel to move on said first rod in the vertical direction and allows said first fence panel to swing around said first rod, and wherein the space between said first rod and said second rod allows said vertical end support of said second fence panel to be easily removed therefrom.

24. The modular fence system according to claim 23, wherein said fencing system includes a conductor positioned on said support structure.

* * * * *